United States Patent [19]

Suzuki

[11] Patent Number: 5,295,394

[45] Date of Patent: Mar. 22, 1994

[54] BYPASS UNIT FOR A FLOWMETER SENSOR

[75] Inventor: Isao Suzuki, Tokyo, Japan

[73] Assignee: MKS Japan Inc., Tokyo, Japan

[21] Appl. No.: 897,797

[22] Filed: Jun. 12, 1992

[30] Foreign Application Priority Data

Jun. 13, 1991 [JP] Japan .................. 3-181517

[51] Int. Cl.⁵ .............................................. G01F 5/00
[52] U.S. Cl. .................................................. 73/202
[58] Field of Search ............... 73/202, 205.5, 204.21, 73/204.22

[56] References Cited

U.S. PATENT DOCUMENTS

| | | |
|---|---|---|
| 4,433,575 | 2/1984 | Rutherford . |
| 4,464,932 | 8/1984 | Ewing et al. . |
| 4,522,058 | 6/1985 | Ewing . |
| 4,524,616 | 6/1985 | Drexel et al. . |
| 4,571,801 | 2/1986 | Ewing . |
| 4,679,585 | 7/1987 | Ewing . |
| 4,877,051 | 10/1989 | Day . |
| 5,044,199 | 9/1991 | Drexel et al. . |

FOREIGN PATENT DOCUMENTS 50-72514 11/1957 Japan .

Primary Examiner—Richard E. Chilcot, Jr.
Assistant Examiner—Harshad Patel
Attorney, Agent, or Firm—Wenderoth, Lind & Ponack

[57] ABSTRACT

A bypass unit of a flowmeter sensor includes a chamber, inlet and outlet paths through which a fluid flows into and out of the chamber, an upstream bypass path through which a portion of the fluid is diverted from the chamber to a sensor tube, and a downstream bypass path through which the portion of the fluid is returned from the sensor tube to the chamber. A bypass member is arranged within the chamber and a space is defined between the peripheral wall of the housing and the bypass member. The bypass member includes inlet and outlet ports formed in coaxial relation to the inlet and outlet paths, respectively, and a plurality of radial ports. A substantially cylindrical partition is disposed between the peripheral wall of the housing and the bypass member to define a space between the peripheral wall of the housing and the partition and between the partition and the bypass member.

3 Claims, 3 Drawing Sheets

BYPASS UNIT FOR A FLOWMETER SENSOR

BACKGROUND OF THE INVENTION

1. Field of the Invention

The present invention relates to a bypass unit for use, for example, in a thermal mass flowmeter sensor.

2. Description of the Related Art

It is well known that laminar flow conditions need to be maintained to measure the flow of a fluid in a shunt or bypass path. Attempts have been made to mount a variety of units to develop laminar flow. One such unit is disclosed, for example, in U.S. Pat. No. 4,522,058. The prior art unit comprises a tubular member, a solid core mounted coaxially within the tubular member, and a plurality of elongate straight wires extending between the tubular member and the core. The wires are likely to be bent when the core is press-fit into the tubular member. If this occurs, then pressure differentials between the inlet end and the outlet end of the unit are no longer proportional to the flow of a fluid resulting in measurement errors. Also, eddies are developed particularly when the wires are substantially bent. Consequently, the unit becomes impractical.

Eddies are hardly developed when a flow path, which is connected to the bypass path, is straight and long, or when a flow rate is low. A typical flow path is, however, curved immediately before it reaches a flowmeter. Such a curved flow path often causes measurement errors. To overcome this, a flow regulating filter in the form of a mesh is mounted to the inlet end of the bypass path. A problem with the use of the filter is that the inlet end of the bypass path is subject to substantial pressure loss.

The sensor has a limited resolution. Also, the sensor tube and the bypass path have limited flow rates. When a pressure differential $\Delta P_1$ between the inlet and the outlet of the sensor tube and a flow rate $Q_1$ of a fluid flowing through the sensor tube exceed a predetermined level, the former is no longer proportional to the latter resulting in measurement errors. Similarly, when a pressure differential $\Delta P_2$ between the inlet and the outlet of the bypass path and a flow rate $Q_2$ of a fluid both exceed a predetermined level, the former is no longer proportional to the latter resulting in measurement errors. Laminar flow can be developed when pressure differentials are proportional to the flow rate of a fluid. On the other hand, turbulence effects which cause measurement errors are created when a pressure differential is proportional to the square of the flow rate.

Generally, a laminar flow is defined as having a Reynolds number $R_D$ of less than 2320. Reynolds number $R_D$ is represented as follows:

$$R_D = (4Q\rho)/(\pi D \eta) \quad (1)$$

where Q is the volumetric flow rate of a fluid flowing through a tube, $\rho$ is the density of the fluid, $\eta$ is the viscosity of the fluid, and D is the diameter of the tube.

From equation (1), it is clear that an increase in the diameter D of the tube results in a corresponding increase in the volumetric flow rate Q of the fluid, provided that the Reynolds number $R_D$ remains constant. However, the sensor per se has a limited size, and the sensor tube and the bypass path also have limited diameters. A plurality of small diameter passages may be arranged in the bypass path in an attempt to substantially increase the diameter D of the tube. This requires a wide variety of elements to develop laminar flow so as to perform measurements over different flow ranges.

To solve the foregoing problems, attempts have been made to place a cylindrical core centrally within a bypass path as disclosed in Japanese laid-open utility model publication No. 59/72514. This arrangement eliminates the need for wires as used in U.S. Pat. No. 4,522,058 and develops no turbulence. A problem with this prior art arrangement is, however, that a fluid is supplied directly to the inlet end of a sensor tube upon introduction into the sensor tube. This causes the sensor tube to detect eddies and thus, generate undesirable noise. Another problem is that the prior art arrangement requires bypass paths of various sizes to perform measurements over increased flow ranges. In addition, the outer periphery of the core and the inner wall of the bypass path must finely be machined when the flow rate of a sensed fluid is less than 10 cc. This results in an increase in the manufacturing steps and costs.

SUMMARY OF THE INVENTION

It is an object of the present invention to overcome the problems encountered in the prior bypass arrangements and to provide a bypass unit for a flowmeter sensor capable of establishing appropriate laminar flow conditions and readily performing measurements over different flow ranges.

According to the present invention, there is provided a bypass unit for a flowmeter sensor which comprises a substantially cylindrical sensor tube through which a fluid flows, the sensor tube constituting a flowmeter, a housing having a peripheral wall to define a chamber therein, the housing including an inlet path communicating with the chamber, an outlet path communicating with the chamber, an upstream bypass path defined to divert a portion of the fluid in the chamber to the sensor tube, and a downstream bypass path defined to return the portion of the fluid to the chamber, and a bypass member received in the chamber with a predetermined space left between the peripheral wall of the housing and the bypass member, the bypass member including an inlet port formed in coaxial relation to the inlet path, an outlet port formed in coaxial relation to the outlet path, and a plurality of radial ports extending radially therethrough to place the inlet and outlet ports in communication with the space.

The bypass member may include an annular recess adjacent to the radial ports so as to cause fluid pressure to build therein.

A substantially cylindrical partition may be disposed between the peripheral wall of the housing and the bypass member to leave spaces between the peripheral wall of the housing and the partition and between the partition and the bypass member. The partition may include at least one aperture to provide a fluid communication between the two spaces.

Further, the partition may include a plurality of apertures which may be axially offset from each other. In use, a selected one of these apertures is kept open, and the rest of the apertures are closed by plugs.

With the bypass unit of the present invention, a fluid is first introduced into the inlet port through the inlet path and then, flows out of the inlet port through the radial ports. By this arrangement, a laminar flow can be established without any substantial pressure loss which may occur when the filter mesh is employed.

The partition cooperates with the bypass member to develop a laminar flow between the inner periphery of the partition and the outer periphery of the bypass member. The partition and the bypass member both have straight and smooth peripheral surfaces and can be more readily machined than the prior art bypass arrangement. This machining operation is required when the flow rate of a small amount of fluid is to be measured.

Selective use of the apertures in the partition results in a change in the pressure differentials in the sensor tube. This allows the bypass unit to perform measurements over different flow ranges.

The bypass member is laterally symmetrical so as to be capable of measuring the flow of a fluid in either of opposite directions. When the fluid flows in a reverse direction, negative pressure differentials will be sensed.

These and other objects and advantages of the present invention will be apparent from the following description of preferred embodiments when taken in conjunction with the accompanying drawings.

DESCRIPTION OF THE PREFERRED EMBODIMENTS

Figure 1:
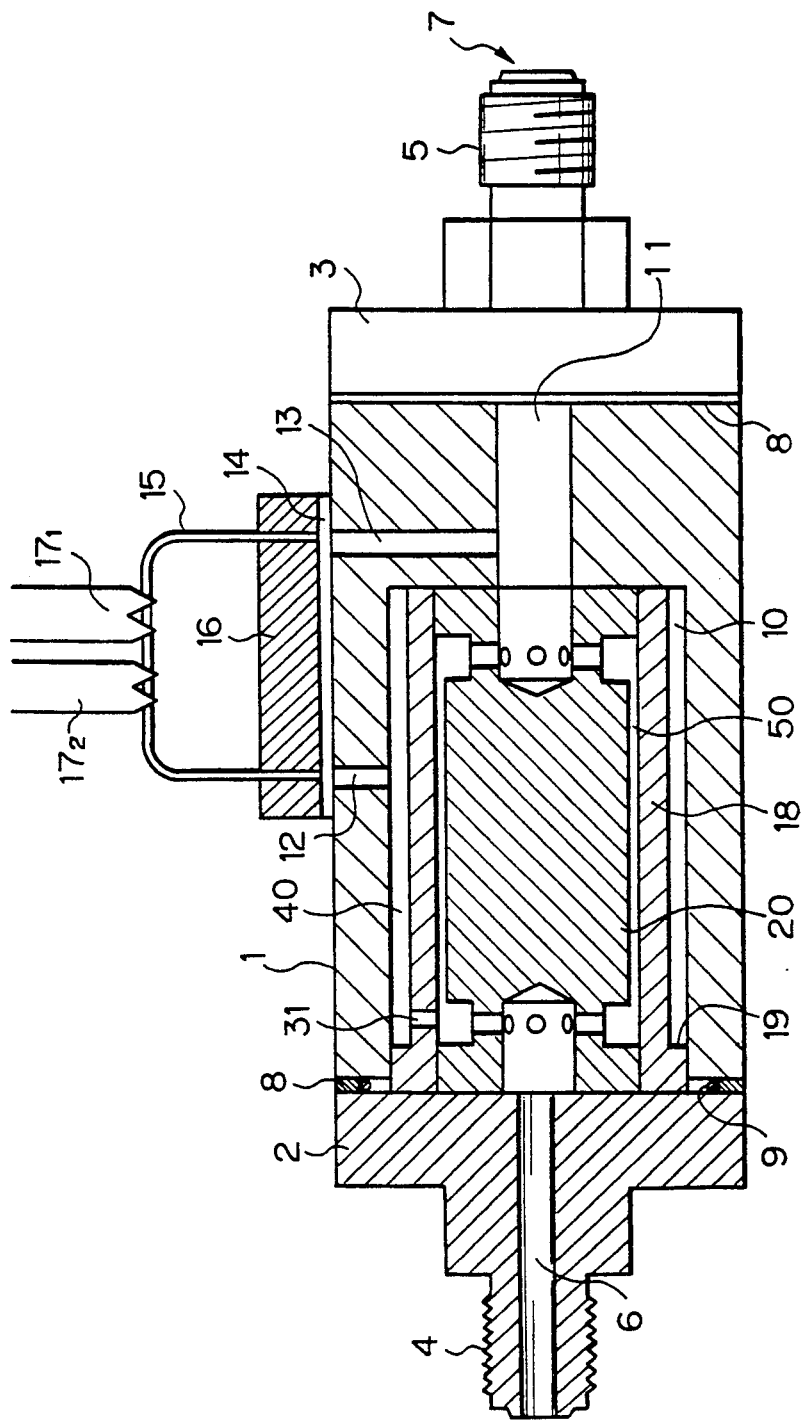
FIG. 1 is a sectional view of one embodiment of a bypass unit according to the present invention.

FIGS. 1 through 7 show a bypass unit for a flowmeter sensor according to the present invention. Like reference numerals designate like parts throughout the several views of the drawings.

Referring now to FIG. 1, a housing member 1 has a parallelepiped configuration. A pair of couplings 2 and 3 are bolted to opposite sides of the housing member 1 so as to form a housing. The couplings 2 and 3 have threaded portions 4 and 5 at their one ends to join pipes (not shown). The threaded portions 4 and 5 extend axially and centrally from opposite sides of the housing. An inlet path 6 and an outlet path 7 extend axially and centrally through the couplings 2 and 3. Seal ring guides 8 and seal rings 9 are interposed between the housing member 1 and the couplings 2 and 3 to inhibit leakage of a fluid. A cylindrical chamber 10 is defined in the housing and extends from one end (left end in FIG. 1) toward the center of the housing member 1. A conduit 11 has a small diameter and extends from the other end (right end in FIG. 1) toward the center of the housing member 1 to communicate with the chamber. The housing has an upstream shunt or bypass path 12. The upstream bypass path 12 extends radially through the cylindrical wall of the housing member 1 and is located at an intermediate position between the opposite ends of the housing member 1. A downstream bypass path 13 extends radially through the housing member 1 to communicate with the conduit 11.

A base 16 is bolted to the housing member 1 through a seal 14. A sensor tube 15 extends through the base 16. The seal 14 has apertures through which the sensor tube 15 communicates with the inlet path 12 and the outlet path 13. The sensor tube includes two heating elements $17_1$ and $17_2$ and cooperates with resistors (not shown) to form a bridge circuit so as to measure the flow rate of a fluid in a known manner. A substantially cylindrical partition 18 is disposed in the chamber 10. A flange 19 extends from one end of the partition 18 and has such an outer diameter as to fit in the peripheral wall of the chamber 10. A portion of the partition other than the flange 19 has an outer diameter smaller than the diameter of the chamber 10 so as to form an annular path or space 40 between the partition 18 and the housing member 1. A substantially cylindrical bypass member 20 is fitted within the partition 18.

Figure 2A:
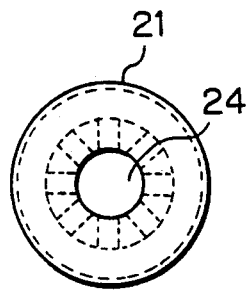
FIG. 2(a) is a side view of a bypass member used in the bypass unit shown in FIG. 1.
Figure 2B:
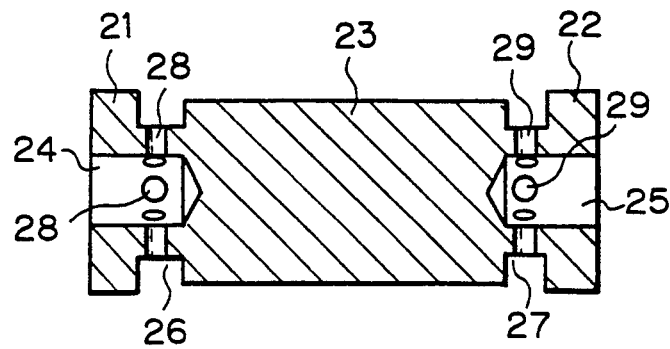
FIG. 2(b) is a vertical sectional view of the bypass member.

FIG. 2(a) is a side view of the bypass member 20 FIG. 2(b) is a vertical sectional view of the bypass member 20. As is clear from FIGS. 2(a) and 2(b), the bypass member 20 includes a cylindrical core 23, and end flanges 21 and 22. An inlet port 24 and an outlet port 25 are defined in coaxial relation to the inlet path 6, the outlet path 7 and the conduit 11. The inlet port 24 extends from one end of the end flange 21 and terminates at one end of the core 23. The outlet port 25 extends from one end of the end flange 22 and terminates at the other end of the core 23. Neck portions 26 and 27 extend between the end flanges 21 and 22 and the core 23, respectively. In the illustrated embodiment, eight radial ports 28 and 29 extend radially through each of the neck portions 26 and 27. The core 23 has a diameter smaller than that of each of the end flanges 21 and 22 such that a space 50 is defined between the bypass member 20 and the partition 18 to receive a fluid.

Figure 3:
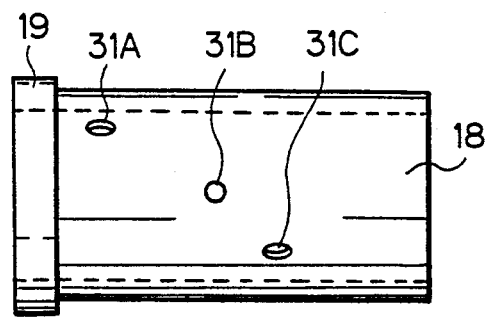
FIG. 3 is a front view of a partition used in the bypass unit.
Figure 4:
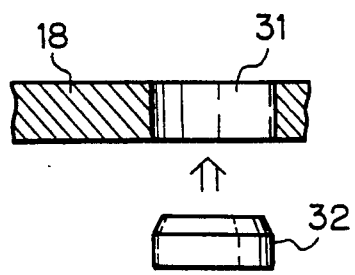
FIG. 4 is an enlarged view showing the manner in which a plug is inserted into an aperture formed in the partition shown in FIG. 3.

FIG. 3 is a front view of the partition 18. As shown in FIG. 3, the partition 18 has a substantially cylindrical wall. Three apertures 31 (31A to 31C) are defined in the wall of the partition 18 offset from one another along the length of the partition 18. In use, only one of the three apertures 31 is kept open, and the remaining apertures are closed by plugs 32 as shown in FIG. 4.

The space 40 defined between the partition 18 and the housing member 1 has a significantly greater cross-sectional area than the space 50 defined between the partition 18 and the bypass member 20. As a fluid flows from left to right in FIG. 1, for example, it first flows into the inlet port 24 and then, reaches the bottom wall of the inlet port 24. This slows down the flow of the fluid. Thereafter, the fluid flows through the radial ports 28. The neck portions 26 and 27 act as "pressure accumulators" and cooperate together to develop a laminar flow in the space 50.

The fluid is introduced into the space 40 through the aperture 31. A portion of the fluid is then diverted to the sensor tube through the upstream bypass path 12 and returned to the conduit 11 through the downstream bypass path 13. The upstream bypass path 12, the sensor tube 15 and the downstream bypass path 13 have significantly greater cross-sectional areas than the space 50. The pressure in the upstream end of the sensor tube 15 is thus substantially the same as that in the neck portion 26. Similarly, the pressure in the downstream end of the sensor tube 15 is substantially the same as that in the neck portion 27. As such, pressure differentials between the upstream end and the downstream end of the sensor tube 15 are substantially identical to those between the neck portions 26 and 27.

Figure 5:
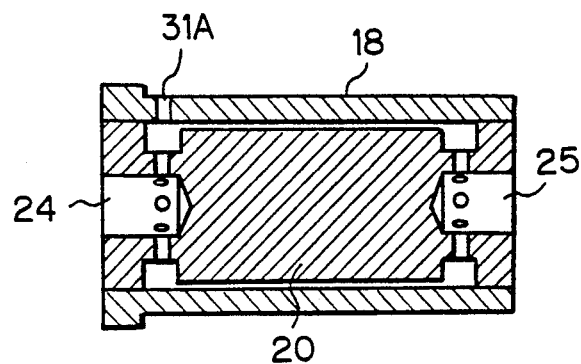
FIGS. 5 to 7 are sectional views showing three different apertures formed in the partition.
Figure 6:
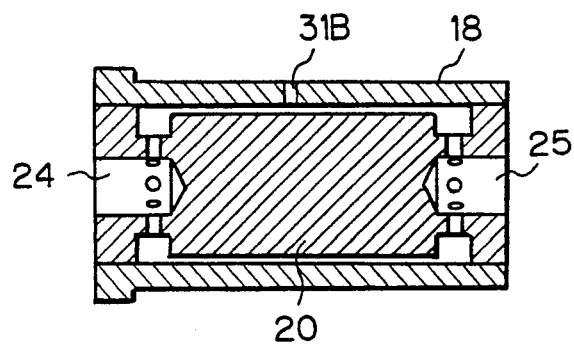
Figure 7:
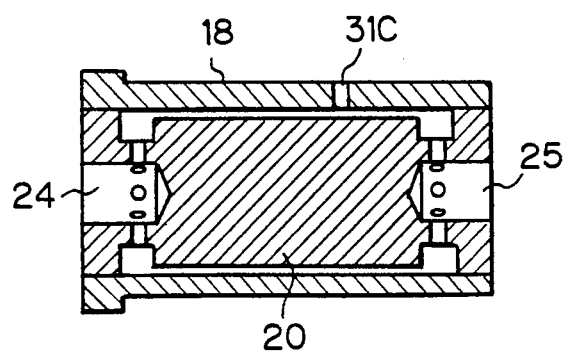

Referring to FIG. 5, the aperture 31A is kept open, and the other two apertures 31B and 31C are closed by the plugs 32 when the flow rate of a small amount of fluid is to be measured. This arrangement allows detection of maximum pressure differentials developed through the space 40. Referring to FIG. 6, the aperture 31B is kept open, and the other two apertures 31A and 31C are closed by the plugs when the flow rate of a medium amount of fluid is to be measured. Referring to FIG. 7, the aperture 31C is kept open, and the other two apertures 31A and 31B are closed by the plugs when the flow rate of a substantial amount of fluid is to be measured. In the illustrated embodiment, only one of the three apertures is selectively kept open to alter the length of the space 50 so as to accommodate changes in the flow of a fluid. Where the space 40 is made narrower to accommodate only a small amount of fluid, the inner wall of the partition 18 is machined to a mirror finish so as to allow measurement of the flow rate of such a small amount of fluid. As the inner wall of the partition is cylindrical and straight, it is easy to effect such a machining operation. The bypass unit is laterally symmetrical to allow for accurate measurement of the flow rate of a fluid flowing in a direction opposite to the direction as described above.

Where the partition is used in a manner shown in FIGS. 5 to 7, the bypass member 20 may be of forms other than that illustrated as long as the space 40 is defined between the partition 18 and the housing member 1.

While the invention has been described in its preferred form, it will be obvious to those skilled in the art that various changes and modifications may be made thereto without departing from the spirit and scope of the invention.

What is claimed is:

1. A bypass unit of a flowmeter sensor, said unit comprising:

a substantially cylindrical sensor tube through which a fluid is to flow;

elements of a flowmeter cooperating with said sensor tube;

a housing having a peripheral wall defining a chamber therein, said housing also defining an inlet path communicating with said chamber, an outlet path communicating with said chamber, an upstream bypass path through which a portion of the fluid in said chamber will be diverted to said sensor tube, and a downstream bypass path through which fluid flowing from said sensor tube will be returned to said chamber; and a bypass member disposed in said chamber and spaced from the peripheral wall of said housing such that a space is defined in said chamber between said bypass member and said peripheral wall, said bypass member defining an inlet port extending coaxially to and communicating with said inlet path, an outlet port extending coaxially to and communicating with said outlet path, first and second annular recesses in the outer periphery of the bypass member, and a plurality of radial ports extending radially outwardly from said inlet and said outlet ports, each said radial port extending radially outwardly from said inlet port being open to said first annular recess, and each said radial port extending radially outwardly from said outlet port being open to said second annular recess such that each of said radial ports communicates with said space.

2. The unit of claim 1, and further comprising a substantially cylindrical partition disposed between and spaced from the peripheral wall of said housing and said bypass member such that spaces are defined between the peripheral wall of said housing and said partition and between said partition and said bypass member, said partition including at least one aperture placing said space between said bypass member and said partition in communication with said space between the peripheral wall of said housing and said partition.

3. The unit of claim 2, wherein said at least one aperture includes a plurality of apertures, and said plurality of apertures are located at positions offset from each other along the axis of said substantially cylindrical partition, and further comprising at least one plug closing all but one of said plurality of apertures.

* * * * *